(12) United States Patent
Lee

(10) Patent No.: US 9,142,980 B2
(45) Date of Patent: Sep. 22, 2015

(54) APPARATUS AND METHOD FOR CONTROLLING CHARGE CAPACITY BALANCING OPERATION OF SECONDARY BATTERY CELL

(71) Applicant: LG CHEM, LTD., Seoul (KR)

(72) Inventor: Sang-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 15 days.

(21) Appl. No.: 14/289,757

(22) Filed: May 29, 2014

(65) Prior Publication Data

US 2014/0266062 A1 Sep. 18, 2014

Related U.S. Application Data

(63) Continuation of application No. PCT/KR2013/010142, filed on Nov. 8, 2013.

(30) Foreign Application Priority Data

Nov. 9, 2012 (KR) .................. 10-2012-0126938

(51) Int. Cl.
*H02J 7/00* (2006.01)
*H01M 10/44* (2006.01)
*H01M 10/48* (2006.01)
*H02J 13/00* (2006.01)

(52) U.S. Cl.
CPC ............ *H02J 7/0014* (2013.01); *H01M 10/44* (2013.01); *H01M 10/48* (2013.01); *H02J 7/0016* (2013.01); *H02J 7/0021* (2013.01); *H02J 13/0003* (2013.01); *H02J 2007/0098* (2013.01)

(58) Field of Classification Search
USPC .................................................. 320/134, 136
See application file for complete search history.

(56) References Cited

U.S. PATENT DOCUMENTS

2011/0215767 A1* 9/2011 Johnson et al. ............... 320/136
2012/0206296 A1* 8/2012 Wan .......................... 342/357.31

FOREIGN PATENT DOCUMENTS

| KR | 10-2001-0026141 A | 4/2001 | |
| KR | 10-2008-0028108 A | 3/2008 | |
| KR | 10-2010-0060155 A | 6/2010 | |
| KR | 20100060155 A * | 6/2010 | B60L 11/18 |

OTHER PUBLICATIONS

International Search Report issued in PCT/KR2013/010142, mailed on Mar. 24, 2014.

* cited by examiner

*Primary Examiner* — Richard Isla Rodas
*Assistant Examiner* — David V Henze-Gongola
(74) *Attorney, Agent, or Firm* — Birch, Stewart, Kolasch & Birch, LLP

(57) ABSTRACT

Provided is an apparatus and method for controlling a charge capacity balancing operation of a secondary battery cell. According to the present disclosure, the charge capacity balancing operation starts under the consideration of an environment condition suitable to perform the charge capacity balancing operation, so that sufficient time for the charge capacity balancing operation of the secondary battery cells may be ensured. Accordingly, this may reduce the possibility of the balancing operation being interrupted.

24 Claims, 10 Drawing Sheets

APPARATUS AND METHOD FOR CONTROLLING CHARGE CAPACITY BALANCING OPERATION OF SECONDARY BATTERY CELL

CROSS-REFERENCE TO RELATED APPLICATION

The present application is a continuation of International Application No. PCT/KR2013/010142 filed on Nov. 8, 2013, which claims priority to Korean Patent Application No. 10-2012-0126938 filed in the Republic of Korea on Nov. 9, 2012, the disclosure of which is incorporated herein by reference.

TECHNICAL FIELD

The present disclosure relates to an apparatus and method for controlling a charge capacity balancing operation of a secondary battery cell, and more particularly, to an apparatus and method for controlling a time to start a charge capacity balancing operation in consideration of a state of use of a secondary battery cell.

BACKGROUND ART

Recently, due to the exhaustion of fossil energy and environmental pollution, the interest in electric products, which may operate with electrical energy instead of fossil energy, is growing more and more. Accordingly, with the increasing development and demand of mobile devices, electric vehicles, hybrid vehicles, energy storage devices, uninterrupted power supplies, or the like, the demand of secondary batteries as energy sources are rapidly increasing as well as its various forms thereof. Therefore, secondary batteries are being studied very actively to cope with such diverse demands.

Generally, a secondary battery includes a nickel cadmium battery, a nickel metal hydride battery, a lithium ion battery, a lithium ion polymer battery, and the like. This secondary battery is largely classified into a lithium-based battery and a nickel metal hydride-based battery. The lithium-based battery is primarily used in a wide range of application including small-scale products, for example, a digital camera, a P-DVD, an MP3P, a mobile phone, a PDA, a Portable Game Device, a Power Tool, an E-bike, and the like, and the nickel metal hydride-based battery is used in a variety of application including large-scale products requiring high output such as an electric vehicle or a hybrid electric vehicle.

Meanwhile, to drive an electric vehicle or a hybrid electric vehicle, an electric motor requiring high output should be operated. Also, in a case of an energy storage device used to supply power to a building or a predetermined area, a sufficient amount of energy to meet the energy demand must be supplied. Accordingly, energy of a desired output or amount is provided using a battery pack in which a plurality of unit secondary battery cells, hereinafter referred to as unit cells, are connected in series or in parallel, to provide high output or high capacity energy.

However, in a case of a battery pack including a plurality of unit cells connected to one another, a charge capacity difference occurs between the respective unit cells as charging and discharging is performed repeatedly. Under the condition of charge capacity imbalance, a particular unit cell having a low charge capacity is over-discharged if the battery pack is continuously discharged, which hinders a stable operation of the battery pack. In contrast, under the condition of charge capacity imbalance, a particular unit cell having a high charge capacity is over-charged if the battery pack is continuously charged, which reduces safety of the battery pack. The charge capacity imbalance puts a certain unit cell into an over-charge state or over-discharge state and thereby hinders stable power supply to a load, for example, an electric motor or an electrical grid. To solve this problem, a charge capacity balancing operation is needed to continuously monitor and balance the charge capacity of unit cells to a predetermined level.

This charge capacity balancing operation is performed in the way of discharging a unit cell having a higher charge capacity than a reference charge capacity through a buck circuit until it reaches the reference charge capacity, or charging a unit cell having a lower charge capacity than the reference charge capacity through a boost circuit until it reaches the reference charge capacity.

However, it takes some time to charge or discharge a secondary battery due to the characteristics of the secondary battery, and as a charge or discharge amount increases and the number of unit cells requiring a balancing operation increases, a period of time taken to complete the balancing operation increases. Further, since use of a battery pack is restricted while a balancing operation of unit cells is in progress, there is a need to control a time to start the balancing operation.

DISCLOSURE

Technical Problem

The present disclosure is designed to solve the problems of the related art, and therefore the present disclosure is directed to providing an apparatus and method for controlling a charge capacity balancing operation of a secondary battery cell.

Technical Solution

To achieve the above object, a balancing control apparatus according to the present disclosure is an apparatus that controls charge capacity balancing of at least two secondary battery cells included in a battery pack, and the balancing control apparatus includes a global positioning system (GPS) module to output current geographical location data of the battery pack using a signal received from a GPS satellite, a real-time clock to store a present time, and a control unit, for when the current geographical location data of the battery pack received from the GPS module matches any one geographical location information among at least one preset geographical location information and a battery management system (BMS) managing and controlling the battery pack is in a sleep mode, a real-time clock is used to calculate a sleep mode duration of the BMS, and when the calculated duration is more than or equal to a preset reference period, outputs a control signal for a charge capacity balancing operation of the secondary battery cells included in the battery pack.

According to an exemplary embodiment of the present disclosure, the control signal outputted from the control unit is a signal for switching the BMS from a sleep mode to an awake mode.

According to another exemplary embodiment of the present disclosure, the control signal outputted from the control unit is a signal for controlling the apparatus for charge capacity balancing of the secondary battery cells.

The control unit according to the present disclosure may determine whether the geographical location data matches the geographical location information, by determining whether the geographical location data is included in a preset radius from the geographical location information.

According to an exemplary embodiment of the present disclosure, the preset geographical location information may be information inputted by a user of the battery pack through a user interface.

According to another exemplary embodiment of the present disclosure, the preset geographical location information is location information associated with a place where the battery pack is charged.

When the preset geographical location information is location information associated with a place where the battery pack is charged, the control unit may store, as charging location data, the geographical location data received from the GPS module when the battery pack is charged, and calculate a number of charge cycles for a same region in the stored charging location data, and may set, as the geographical location information, charging location data exceeding a preset number of charge cycles among the calculated number of charge cycles. Also, the control unit may store, as charging location data, the geographical location data received from the GPS module when the battery pack is charged, and calculate a charging ratio for a same region in the stored charging location data, and may set, as the geographical location information, charging location data exceeding a preset charging ratio among the calculated charging ratio. Also, the control unit may store, as charging location data, the geographical location data received from the GPS module when the battery pack is charged, and calculate a charging ratio for a same region in the stored charging location data, and may set, as the geographical location information, charging location data corresponding to a preset number of highest ratios among the calculated charging ratio.

According to an exemplary embodiment of the present disclosure, when the control unit receives a charge capacity balancing request signal outputted from the BMS before the BMS has switched to the sleep mode, the control unit determines whether the current geographical location data of the battery pack received from the GPS module matches the at least one preset geographical location information or calculates the sleep mode duration of the BMS.

The balancing control apparatus according to the present disclosure may further include a memory unit to store the geographical location data, the preset geographical location information, and the preset reference period.

The balancing control apparatus according to the present disclosure may become one component of a battery management system. Also, the balancing control apparatus may become one component of a battery pack including a battery management system and at least two secondary battery cells.

To achieve the above object, a balancing control method according to the present disclosure is a method that controls charge capacity balancing of at least two secondary battery cells included in a battery pack, and the balancing control method includes (a) determining whether current geographical location data of the battery pack received from a GPS module matches any one geographical location information among at least one preset geographical location information, (b) determining whether a BMS managing and controlling the battery pack is in a sleep mode when the geographical location data matches the geographical location information, (e) calculating a sleep mode duration of the BMS when the BMS is in the sleep mode, and determining whether the calculated sleep mode duration of the BMS is more than or equal to a preset reference period, and (d) outputting a control signal for a charge capacity balancing operation of the secondary battery cells when the sleep mode duration of the BMS is more than or equal to the preset reference period.

Advantageous Effects

According to an aspect of the present disclosure, a charge capacity balancing operation may start under the consideration of an environment condition suitable to perform the charge capacity balancing operation, thereby ensuring sufficient time for a charge capacity balancing operation of secondary battery cells. Accordingly, a possibility that the balancing operation will be interrupted may be reduced.

According to another aspect of the present disclosure, since sufficient time for the charge capacity balancing operation of the secondary battery cells is ensured, an efficient balancing operation may be achieved. Accordingly, a charge capacity difference between the secondary battery cells may be further reduced.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
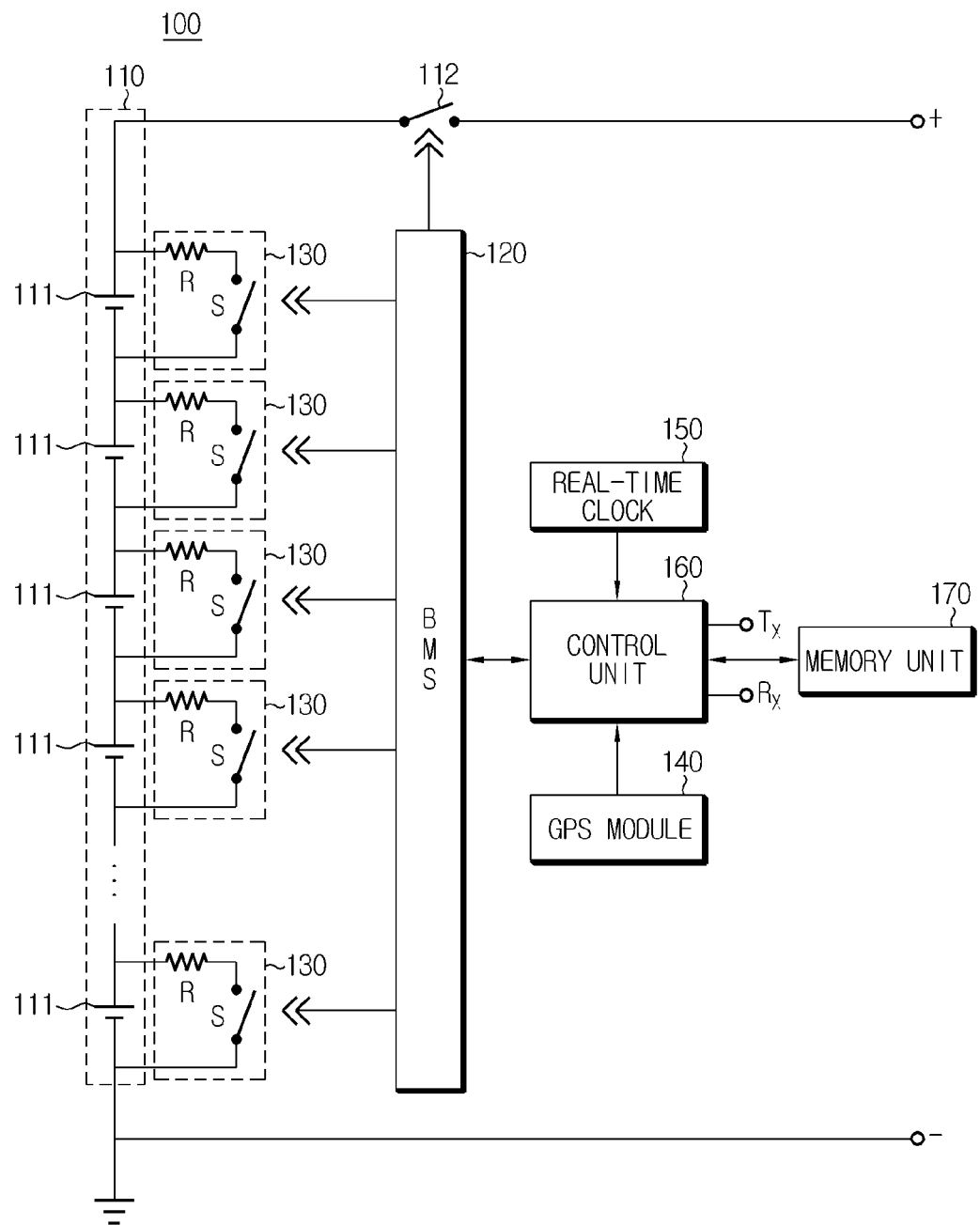
FIG. 1 is a block diagram schematically illustrating a configuration of a balancing control apparatus according to an exemplary embodiment of the present disclosure.

FIG. 1 is a block diagram schematically illustrating a configuration of a balancing control apparatus 100 according to an exemplary embodiment of the present disclosure.

The balancing control apparatus 100 according to the present disclosure corresponds to an apparatus for controlling a charge capacity balancing operation of at least two secondary battery cells 111 included in a battery pack 110. The buttery pack 110 is not limited to a specific type if it includes at least one secondary battery cell 111. Each secondary battery cell 111 is rechargeable and needs consideration of a charge or discharge voltage, and may include a lithium ion battery, a lithium polymer battery, a Ni—Cd battery, a Ni-MH battery, a Ni—Zn battery, and the like. Also, the number of the secondary battery cells 111 included in the battery pack 110 may be variously set based on a required output voltage or charge/discharge capacity. However, the present disclosure is not limited by a type, an output voltage, and a charge capacity of the secondary battery cell 111, and the like. Although FIG. 1 shows an embodiment in which the secondary battery cells 111 are all connected in series, the present disclosure is not limited by a connection method of the secondary battery cells 111.

A load (not shown) that is supplied with power outputted from the battery pack 110 may be connected between a high potential terminal (+) of the battery pack 110 and a low potential terminal (−). The load may include a driving motor of an electric vehicle or a hybrid vehicle, a direct current (DC)-to-DC converter, and the like, and the present disclosure is not limited by a type of the load.

In addition to this basic structure, the battery pack 110 further includes a battery management system (BMS) to monitor and control a state of the secondary battery cell 111 by applying an algorithm for control of power supply to a driving load such as a motor or the like, measurement of a value of electrical characteristic such as current or voltage, charge/discharge control, voltage equalization control, state of charge (SOC) estimation, and the like. Although FIG. 1 shows an embodiment in which the BMS 120 controls the power supply to the load through a switch 112 connected to the high potential terminal (+) of the battery pack 110, it should be understood that this is provided by way of illustration only.

The BMS 120 stands by in a sleep mode when the BMS 120 does not need to control the battery pack 110 or measure values of electrical characteristics, and wakes up by a control signal from a main control system (not shown) or a higher-level BMS (not shown) that controls the BMS 120. For this, the BMS 120 may be connected to the main control system or higher-level BMS via a communication network based on a known communication protocol for the purpose of transmission/reception of the control signal and data communication related to the state of the secondary battery cell 111. However, for simplification of the drawing, a detailed configuration of the BMS 120, the main control system controlling the BMS 120, and the communication network are not shown. Also, configurations, functions, and roles of the BMS 120, the main control system, and the communication network are well known to a person having an ordinary skill in the art pertaining to the present disclosure, and thus a more detailed description is omitted herein.

Meanwhile, a balancing device 130 is connected to each secondary battery cell 111 to adjust the charge capacity. The balancing device 130 may correspond to a boost circuit or a buck circuit. The boost circuit or buck circuit is well known to a person having an ordinary skill in the art, and thus a detailed description is omitted herein. However, for simplification of the drawing and convenience of the understanding, the balancing device 130 is illustrated in FIG. 1 as a simple buck circuit including a resistance element R and a switch S connecting the resistance element R to both ends of each secondary battery cell 111. However, the present disclosure is not limited by a type, a configuration, and number of the balancing device 130, and the like.

The balancing control apparatus 100 according to the present disclosure includes a global positioning system (GPS) module 140, a real-time clock 150, and a control unit 160.

The GPS module 140 outputs data of a current geographical location of the battery pack 110 using a signal received from a UPS satellite. Hereinafter, the data outputted from the UPS module 140 is referred to as a geographical location data. The UPS-assisted location measurement refers to a method that calculates and measures an orbital distance of a UPS satellite and a delay time of waves transmitted from the satellite, and obtains a current geographical location. The UPS module 140 may output data representing the geographical location data of the battery pack 110 by latitude and longitude coordinates, and the geographical location data may be outputted in real time, periodically, or at a required point in time. The UPS technology is well known in the art, and thus a detailed description is omitted herein.

The real-time clock 150 stores a present time. For example, the real-time clock 150 may be a real-time clock (RTC) device. The RTC is a clock that operates by electrical energy, and generally, is widely used as a time measuring device. The RTC includes a memory, and a value stored in the memory may include a year, a month, a day, an hour, a minute, and a second. Accordingly, the control unit 160 may read the present time stored in the RTC.

When a particular condition is satisfied, the control unit 160 outputs a control signal for the charge capacity balancing operation of the secondary battery cells 111. As described in the foregoing, to balance the charge capacity of the secondary battery cells 111, some more time is needed, and use of the battery pack 110 is restricted to some extent while the balancing operation is in progress. Accordingly, when a suitable environment for the charge capacity balancing operation of the secondary battery cells 111 is prepared, the control unit 160 outputs a control signal to enable the charge capacity balancing operation to start.

Meanwhile, the balancing control apparatus 100 according to the present disclosure may include a memory unit 170. The memory unit 170 is a high-capacity storage medium such as a semiconductor device or hard disk that is known as being capable of recording and erasing data, for example, random access memory (RAM), read-only memory (ROM), electrical erasable programmable read-only memory (EEPROM), and the like, and encompasses any device capable of storing information regardless of a device type and is not limited to a specific memory device. A role of the memory unit 170 will be described below in more detail.

In the description of a control algorithm of the control unit 160, to help the convenience of understanding, the description is provided under the assumption that the battery pack 110 is a power supply device mounted in an electric vehicle used to commute back and forth from home and work. In this case, the time that ensures sufficient amount of time for charge capacity balancing operation of the secondary battery cells 111 is when the electric vehicle is parked at work or at home after work. Hereinafter, the description of the control algorithm of the control unit 160 will be provided in this assumed situation.

The control unit 160 receives the geographical location data of the battery pack 110 from the GPS module 140. Also, the control unit 160 compares the geographical location data to preset geographical location information. In the specification, the geographical location information refers to a particular location value to enable the control unit 160 to output a signal for controlling the balancing operation, and may be stored in the memory unit 170. The geographical location information corresponds to information of at least one geographical location, and multiple geographical locations may be set and stored.

In this instance, the geographical location information may correspond to information inputted from a user through a user interface. That is, the user may determine that a location of a workplace or house is proper for the charge capacity balancing operation, and may directly input the location. To do so, the control unit 160 may further include input/output terminals (Tx, Rx) to set and store the geographical location information from the user interface. In the case of the above assumed situation, the control unit 160 determines whether the geographical location data received from the GPS module 140 matches the location of the user house inputted beforehand, by comparing them.

When the control unit 160 compares the geographical location data received from the UPS module 140 to the preset geographical location information, the control unit 160 does not necessarily only determine whether they are identical to one another. The current GPS technology can identify a geographical location within an error range of 1 m. Thus, if determination is only made on whether geographical locations are identical, even though the electric vehicle arrives at a place (for example, workplace or house) corresponding to the preset geographical location information, the geographical location condition may be determined to be unsatisfied. Accordingly, the control unit 160 may determine whether the geographical location data is included in a preset radius from the geographical location information. In this instance, the preset radius may be variously set in consideration of characteristics of an apparatus in which the battery pack 110 is used, a surrounding environment, and the like, and may be stored in the memory unit 170.

Also, the control unit 160 detects whether the BMS 120 is in a sleep mode. One of the suitable environments to perform the charge capacity balancing operation of the secondary battery cell ills is when the BMS 120 managing and controlling the battery pack 110 is in a sleep mode. The situation in which the BMS 120 is in a sleep mode implies a situation in which charging or discharging of the battery pack 110 is not in progress, that is, a situation in which the battery pack 110 is in a non-use state. In the case of the above assumed situation, the user will completely turn off the electric vehicle upon arriving home. At this time, since the electric vehicle has completed running, the main control system of the electric vehicle may output a control signal to enable the BMS 120 managing the battery pack 110 to switch to a sleep mode. In this instance, the BMS 120 may notify the control unit 160 of the switch to a sleep mode. In contrast, the control unit 160 may also know that the BMS 120 has switched to a sleep mode by continuously monitoring the state of the BMS 120. Also, the control unit 160 may receive information about whether the BMS 120 is in a sleep mode from the main control system monitoring the state of the BMS 120.

Also, when the BMS 120 managing the battery pack 110 has switched to a sleep mode, the control unit 160 reads a present time from the real-time clock 150 and stores the read present time in the memory 170. In this instance, the control unit 160 may store the present time read from the real-time clock 150 as a 'time when a BMS has switched to a sleep mode' in the memory unit 170. Also, the control unit 160 continues to read a present time from the real-time clock 150, and through comparing the read present time to the 'time when a BMS has switched to a sleep mode', calculates a period of time during which the sleep mode of the BMS lasts, called a 'sleep mode duration'.

Also, when the calculated sleep mode duration of the BMS 120 is more than or equal to a preset reference period, the control unit 160 outputs a control signal to start the charge capacity balancing operation of the secondary battery cells 111. The reference period may be variously set in consideration of an environment in which a load connected to the battery pack 110 is used, and the like. For example, after the electric vehicle completes running like the above assumed situation and is parked in front of the house at night, the electric vehicle may start running again in the morning. In this case, the reference period may be set to enable the balancing operation to be performed during the time the electric vehicle is parked, that is, when the electric car is not in operation. In this instance, the reference period may be stored in the memory unit 170.

When the location condition and the time condition are satisfied, the control signal to be outputted from the control unit 160 may correspond to a signal for waking up the BMS 120. The wake-up signal is a signal for controlling the BMS 120 to wake up from the sleep mode. The BMS 120 awakened by the control unit 160 may proceed with the charge capacity balancing operation of the secondary battery cells 111 by the preset balancing algorithm.

According to the present disclosure, the control unit 160 may set the geographical location information based on data associated with a place where the battery pack 110 is charged. The charge capacity balancing operation of the secondary battery cells 111 may be carried out during charging and discharging of the battery pack 110 and after charging and discharging has completed. However, as described in the foregoing, there is a high possibility that sufficient time for the charge capacity balancing operation of the secondary battery cells 111 may be ensured after charging has completed. Accordingly, when the place where charging of the battery pack 110 is carried out is set as the geographical location information, sufficient time for balancing the charge capacity of the secondary battery cells 111 may be ensured.

According to an exemplary embodiment of the present disclosure, the control unit 160 stores, as 'charging location data', the geographical location data received from the GPS module 140 when the battery pack 110 is charged, in the memory unit 170. As the number of charge cycles of the battery pack 110 increases, the charging location data stored in the memory unit 170 will also increase. Then, the control unit 160 calculates the number of charge cycles for the same region in the stored charging location data. In this instance, the same region refers to charging location data included within a preset radius from any one charging location data among the stored charging location data. Also, the control unit 160 may set, as the geographical location data, charging location data exceeding a preset number of charge cycles among the calculated number of charge cycles. The preset number of charge cycles may be variously set in consideration of an environment in which the battery pack 110 is used, a charging period, and the like, and may be stored in the memory unit 170.

According to another exemplary embodiment of the present disclosure, the control unit 160 calculates a charging ratio for the same region in the stored charging location data. Also, the control unit 160 may set, as the geographical location information, charging location data exceeding a preset ratio among the calculated charging ratio. The preset ratio may be variously set in consideration of an environment in which the battery pack 110 is used, a charging period, and the like, and may be stored in the memory unit 170.

According to still another exemplary embodiment of the present disclosure, the control unit 160 calculates a charging ratio for the same region in the stored charging location data. Also, the control unit 160 may set, as the geographical location information, charging location data corresponding to a preset number of highest ratios among the calculated charging ratio. The preset number may be at least one, and may variously set in consideration of an environment in which the battery pack 110 is used, a charging period, and the like, and may be stored in the memory unit 170.

Meanwhile, according to yet another exemplary embodiment of the present disclosure, when the control unit 160 receives a 'charge capacity balancing request signal' outputted from the BMS 120 before the BMS 120 has switched to a sleep mode, the control unit 160 executes the algorithm of the control unit 160 described in the foregoing. In the specification, when the BMS 120 determines that the charge capacity balancing operation of the secondary battery cells 111 is necessary, a signal being outputted to the control unit 160 is referred to as a 'charge capacity balancing request signal'. The charge capacity balancing algorithm preset to the BMS 120 may involve calculating the charge capacity of the secondary battery cells 111, and determining whether the charge capacity balancing operation is necessary based on the calculated charge capacity. The algorithm for determining whether the charge capacity balancing operation is necessary may be executed after the BMS 120 wakes up from a sleep mode by the control unit 160, but may be also executed before the BMS 120 has switched to a sleep mode. Accordingly, only when the charge capacity balancing operation of the secondary battery cells III is necessary, the BMS 120 controls the control unit 160 to execute the foregoing control algorithm. Accordingly, only when the BMS 120 receives the 'charge capacity balancing request signal', the BMS 120 may determine whether the current geographical data of the battery pack 110 received from the GPS module 140 matches the at least one preset geographical location information or may calculate the sleep mode duration of the BMS 120. In this case, the control unit 160 may be prevented from unnecessarily executing an algorithm for outputting a control signal for a charge capacity balancing operation.

According to another exemplary embodiment of the present disclosure, the control signal outputted from the control unit 160 may correspond to a signal for directly controlling the balancing device 130.

Figure 2:
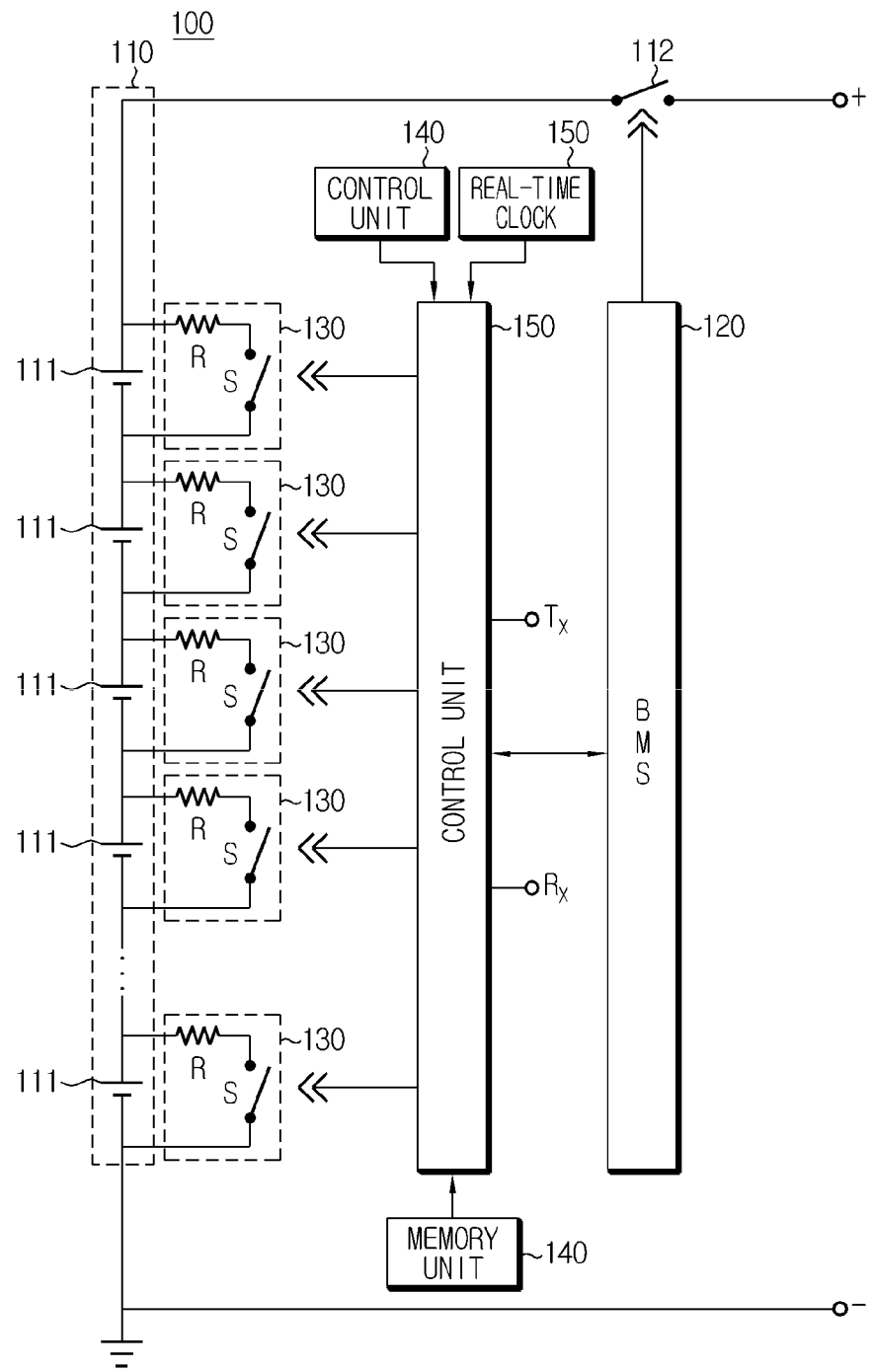
FIG. 2 is a block diagram schematically illustrating a configuration of a balancing control apparatus according to another exemplary embodiment of the present disclosure.

FIG. 2 is a block diagram schematically illustrating a configuration of a balancing control apparatus 100 according to another exemplary embodiment of the present disclosure.

Referring to FIG. 2, although this embodiment is almost identical in configuration to the embodiment of FIG. 1, it can be seen that the control unit 160 outputs a control signal directly to the balancing device 130. In this case, the control unit 160 controls a balancing operation without waking up the BMS 120 from a sleep mode. To do so, the control unit 160 may further include an algorithm for balancing the charge capacity of the secondary battery cells 111, and to measure the charge capacity for each secondary battery cell 111, a voltage sensor, a current sensor, and the like may be additionally provided and connected to the control unit 160. However, for simplification of drawings, the voltage sensor, the current sensor, and the like for measuring the charge capacity of the secondary battery cells 111 are not shown.

The balancing control apparatus 100 according to the present disclosure may be implemented as a separate configuration from the BMS 120 as shown in FIGS. 1 and 2, but may be included in the BMS 120. In the latter case, the control unit 160 may be included as a part of a microprocessor or application-specific integrated circuit (ASIC) responsible for managing and controlling the battery pack 110, and may be implemented as an algorithm and included in the microprocessor or ASIC.

Also, the balancing control apparatus 100 according to the present disclosure may become one component of the battery pack 110 including the BMS 120 and the at least two secondary battery cells 111.

To execute various control logics described in the foregoing, the control unit 160 may include a processor, an application-specific integrated circuit (ASIC), other chipsets, a logic circuit, a register, a communication modem, and a data processing device, known in the art pertaining to the present disclosure. Also, when the exemplary control logics are implemented as software, the control unit 160 may be implemented as an assembly of program modules. In this instance, the program module may be stored in a memory and executed by a processor. Here, the memory may be inside or outside the processor and connected to the processor by various well-known means. The memory collectively refers to a device used to store information regardless of a device type, and is not limited to a specific memory device.

Hereinafter, a balancing control method corresponding to an operation mechanism of the balancing control apparatus 100 is described. However, when a component of the balancing control apparatus 100 described in the foregoing is mentioned again, an overlapping description of a function of the corresponding component and the like is omitted herein.

Figure 3:
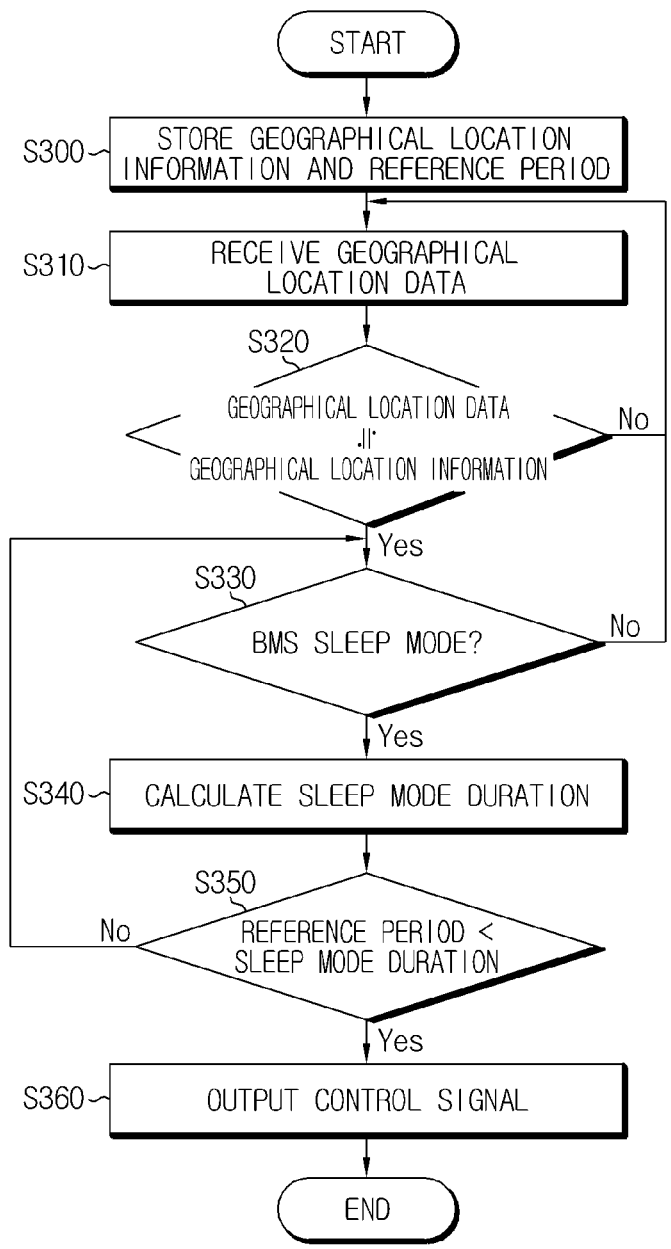
FIG. 3 is a flowchart illustrating a balancing control method in a sequential order according to an exemplary embodiment of the present disclosure.

FIG. 3 is a flowchart illustrating a balancing control method in a sequential order according to an exemplary embodiment of the present disclosure.

First, in S300, the control unit 160 stores geographical location information and a reference period in the memory 170. Since the geographical location information and the reference period are described in the foregoing, an overlapping description is omitted herein. Also, it is assumed that the geographical location information is inputted directly by a user using a user interface.

Subsequently, in S310, the control unit 160 receives geographical location data from the GPS module 140. The geographical location data may be set to be received in the control unit 160 in real time, periodically, or at a required point in time. Also, the received geographical location data may be stored in the memory unit 170. As described in the foregoing, when the control unit 160 compares the geographical location data received from the GPS module 140 to the preset geographical location information, the control unit 160 does not necessarily determine whether they are identical to one another. The control unit 160 may determine whether the geographical location data is included in a preset radius from the geographical location information. In this instance, the radius may be also preset and stored in the memory unit 170.

Subsequently, in S320, the control unit 160 determines whether the geographical location data matches the geographical location information.

When the geographical location data does not match the geographical location information (No in S320), the control unit 160 reverts the process to S310 and receives new geographical location data. In contrast, when the geographical location data matches the geographical location information (YES in S320), the control unit 160 passes the process to S330.

In S330, the control unit 160 determines whether the BMS 120 has switched to a sleep mode. When the BMS 120 has not switched to a sleep mode (NO in S330), the control unit 160 reverts the process to S310 and receives new geographical location data. In contrast, when the BMS 120 has switched to a sleep mode (YES in S330), the control unit 160 determines that an environment for a charge capacity balancing operation has been prepared and passes the process to S340.

In S340, the control unit 160 reads a preset time stored in the real-time clock 150. In this instance, the control unit 160 may store the present time read from the real-time clock 150 as a 'time when a BMS has switched to a sleep mode' in the memory unit 170. Also, the control unit 160 continues to read a present time from the real-time clock 150, and through comparing the read present time to the 'time when a BMS has switched to a sleep mode', calculates a period of time during which the sleep mode of the BMS lasts.

Subsequently, in S350, the control unit 160 compares the calculated sleep mode duration of the BMS to the preset reference period. When the sleep mode duration of the BMS is less than or equal to the reference period (NO in S350), the control unit 160 reverts the process to S330. Also, the control unit 160 detects that the sleep mode of the BMS 120 continues, and calculates a sleep mode duration of the BMS again. In the middle of repeating this process, when the sleep mode of the BMS 120 is released, the control unit 160 reverts the process to S310.

In contrast, when the sleep mode duration of the BMS is longer than the reference period (YES in S350), the control unit 160 determines that a condition for a charge capacity balancing operation is satisfied and passes the process to S360.

In S360, the control unit 160 outputs a signal for controlling the charge capacity balancing operation. In this instance, the control signal being outputted may be a signal for waking up the BMS 120 as described in the foregoing, and may be a signal for controlling the balancing device 130 directly.

FIGS. 4 through 9 are flowcharts illustrating a balancing control method in a sequential order according to another exemplary embodiment of the present disclosure.

The embodiments of FIGS. 4 through 9 correspond to an embodiment in which the geographical location information is set in association with a place where the battery pack 110 is charged. Accordingly, it can be seen that the step S300 is replaced with steps S301 through S307 and subsequent steps S310 through S360 are the same when compared to FIG. 3. Accordingly, the embodiments of FIGS. 4 through 9 are described based on a changed disclosure in comparison to the embodiment of FIG. 3.

Figure 4:
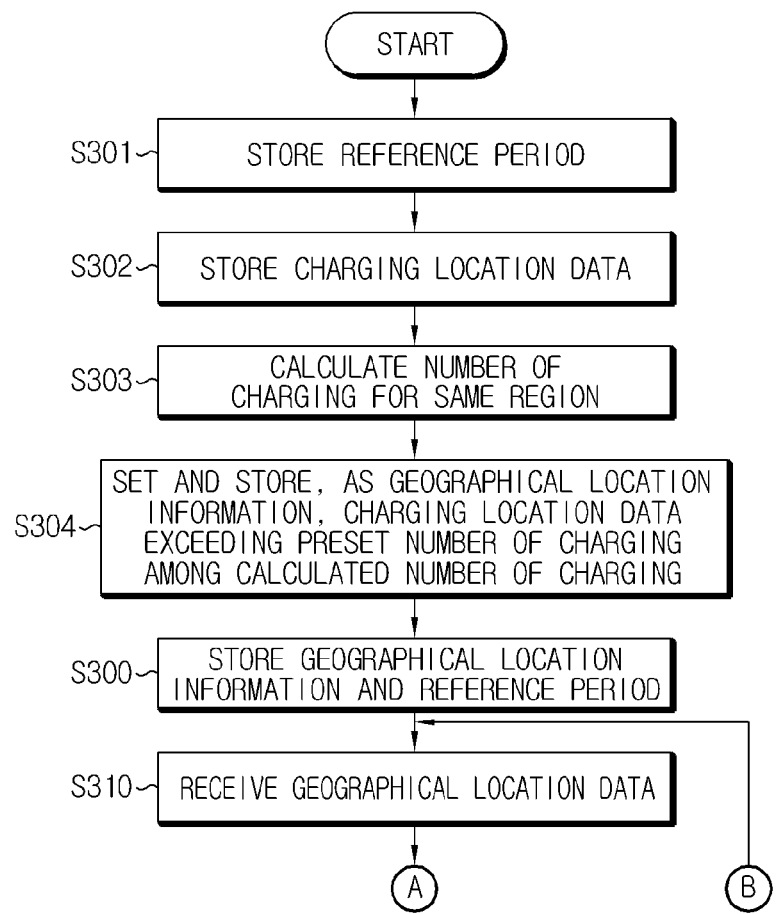
FIGS. 4 and 5 are flowcharts illustrating a balancing control method in a sequential order according to another exemplary embodiment of the present disclosure.
Figure 5:
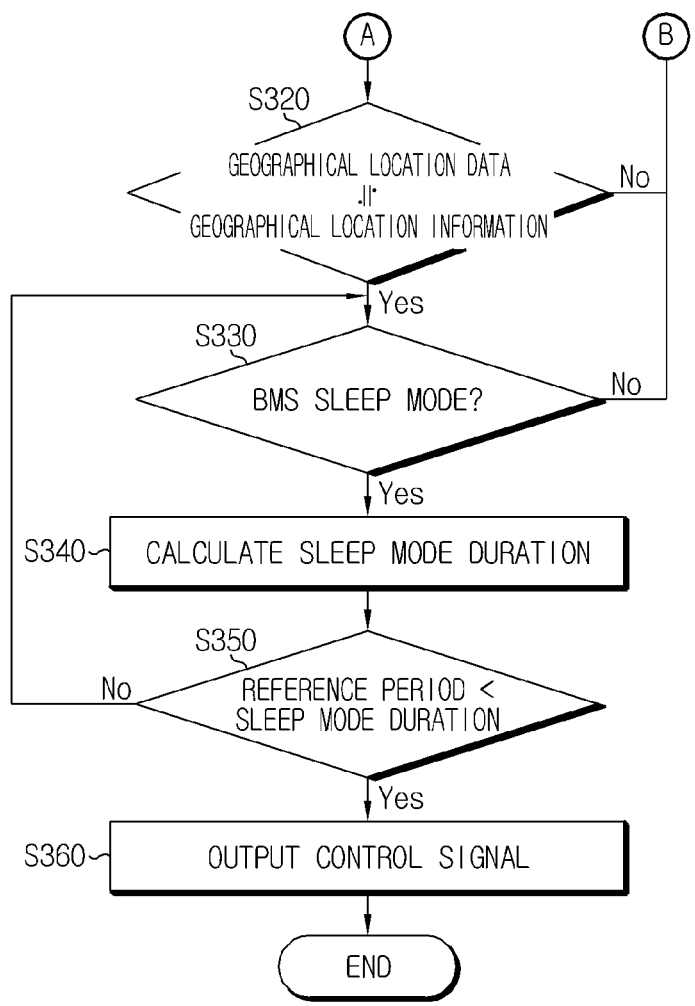

Referring to FIGS. 4 and 5, first, in S301, the control unit 160 stores a reference period in the memory unit 170. In comparison to the embodiment of FIG. 3, this embodiment is characterized in that the geographical location information is not set and stored in S301.

Subsequently, in S302, the control unit 160 stores, as charging location data, geographical location data received from the GPS module 140 when the battery pack 110 is charged in the memory unit 170. Also, in S303, the control unit 160 calculates the number of charge cycles for the same charging region in the charging location data stored in the memory unit 170. As described in the foregoing, the same region may refer to charging location data included within a preset radius from any one charging location data among the stored charging location data.

Also, in S304, the control unit 160 sets, as the geographical location information, charging location data exceeding a preset number of charge cycles among the calculated number of charge cycles. The preset number of charge cycles may be variously set in consideration of an environment in which the battery pack 110 is used, a charging period, and the like, and may be stored in the memory unit 170.

The control unit 160 completes the process of S304 and passes to S300. The process subsequent to S310 is the same as the embodiment of FIG. 3.

Figure 6:
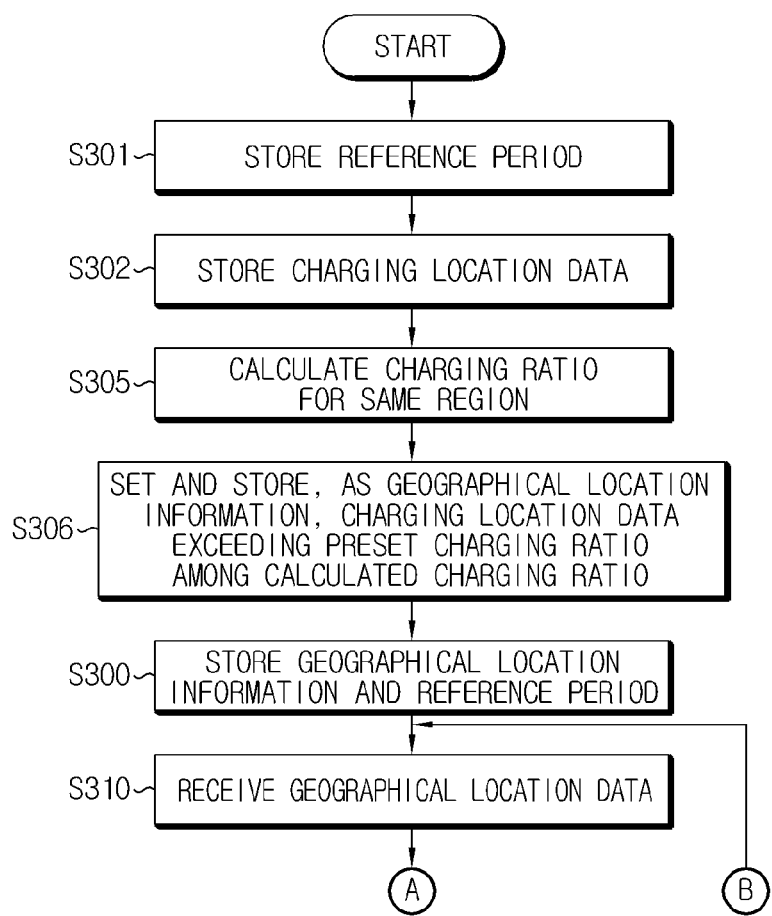
FIGS. 6 and 7 are flowcharts illustrating a balancing control method in a sequential order according to still another exemplary embodiment of the present disclosure.
Figure 7:
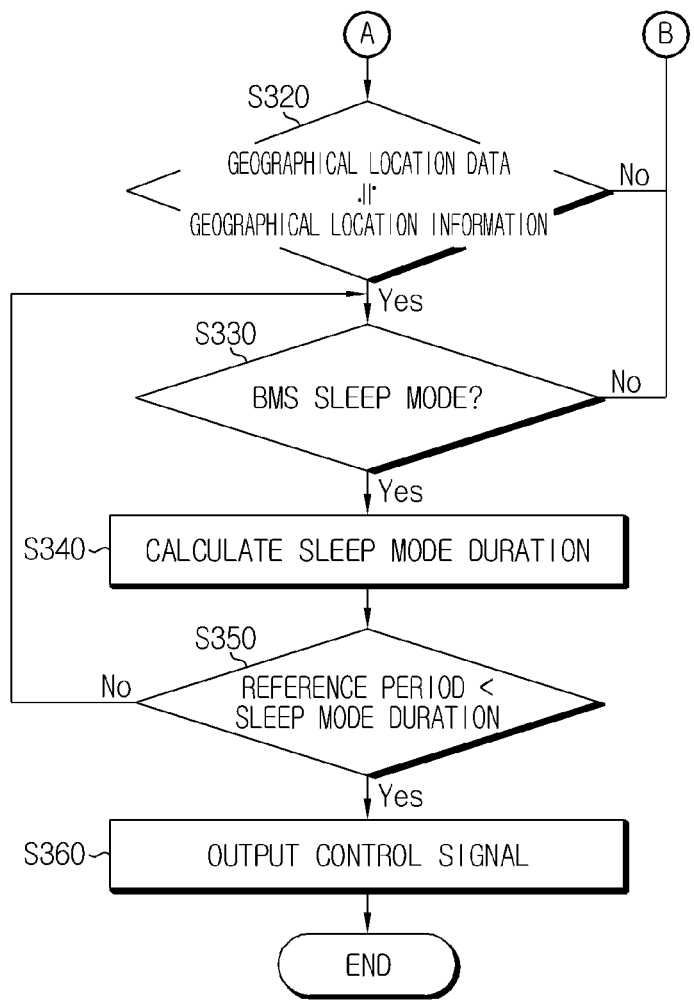

Referring to FIGS. 6 and 7, it can be seen that S301 and S302 are the same and S303 and S304 of FIGS. 4 and 5 are replaced with S305 and S306 when the embodiment shown in FIG. 5 is compared to the embodiment shown in FIGS. 4 and 5. In S305, the control unit 160 calculates a charging ratio of the same region. There is a difference in that the number of charge cycles is calculated in S303 of the embodiment shown in FIG. 3 in the foregoing. Also, in S306, the control unit 160 sets and stores, as the geographical location information, charging location data exceeding a preset ratio among the calculated charging ratio.

The control unit 160 completes the process of S306 and passes to S300. The process subsequent to S310 is the same as the embodiment of FIG. 3.

Figure 8:
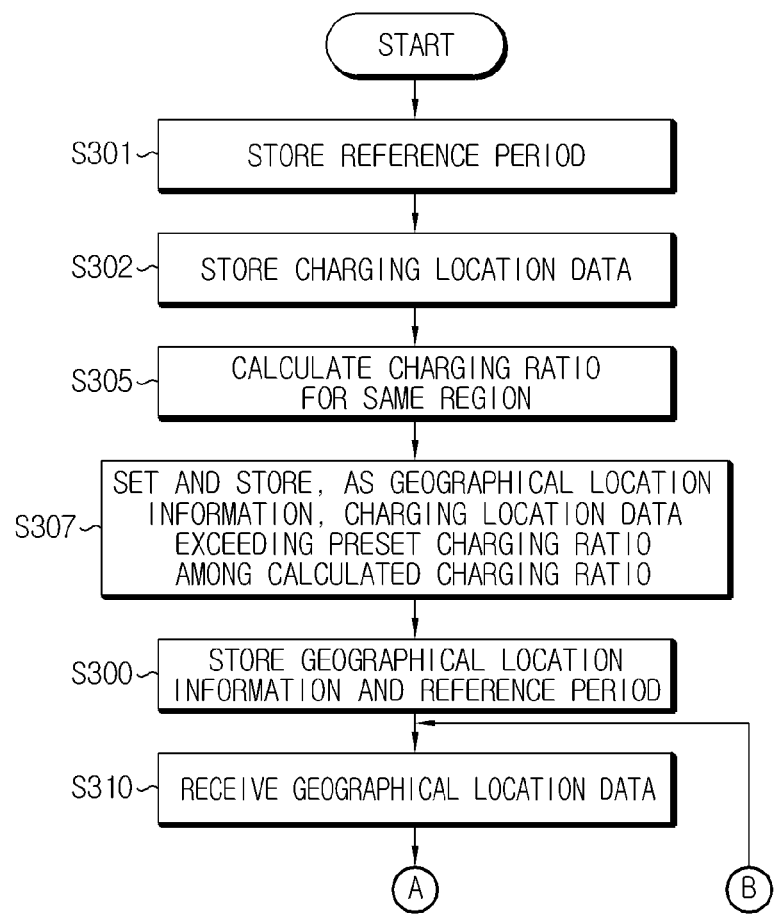
FIGS. 8 and 9 are flowcharts illustrating a balancing control method in a sequential order according to yet another exemplary embodiment of the present disclosure.
Figure 9:
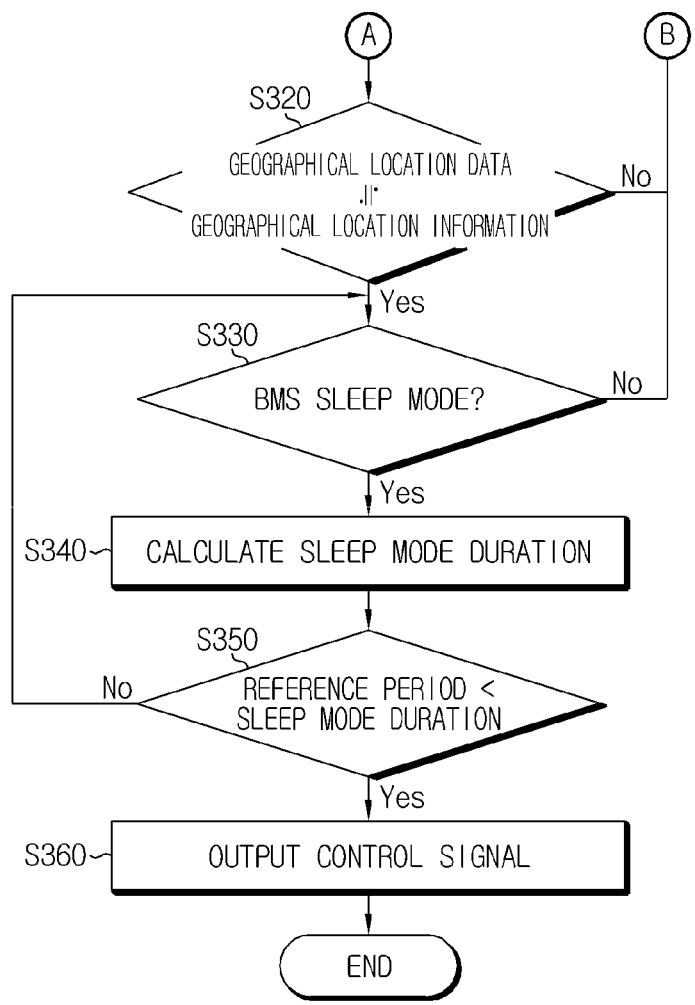

Referring to FIGS. 8 and 9, it can be seen that S301, S302, and S305 are the same and S306 shown in FIGS. 4 and 5 is replaced with S307 when the embodiment shown in FIGS. 8 and 9 is compared to the embodiment shown in FIGS. 6 and 7. In S307, the control unit 160 sets and stores, as the geographical location information, charging location data corresponding to a preset number of highest ratios among the calculated charging ratio.

The control unit 160 completes the process of S307 and passes to S300. The process subsequent to S310 is the same as the embodiment of FIG. 3.

Figure 10:
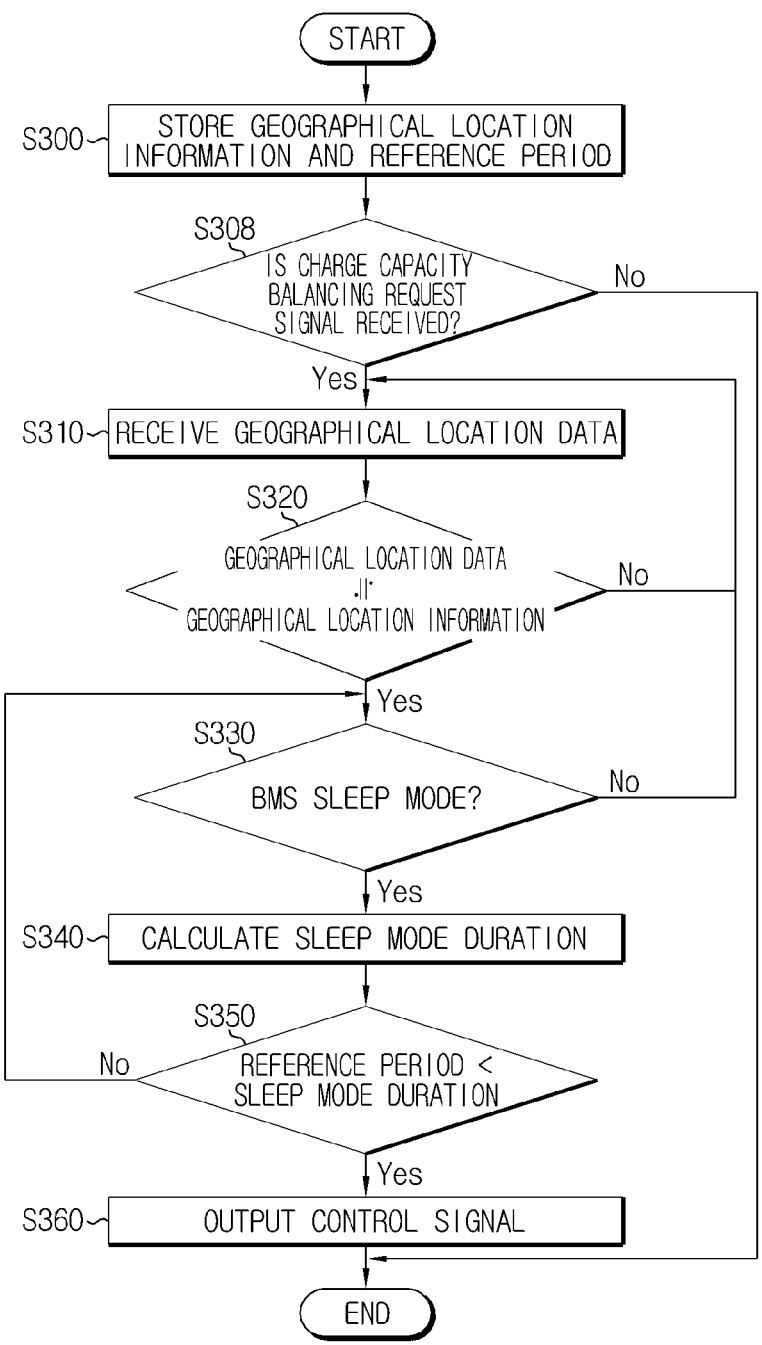
FIG. 10 is a flowchart illustrating a balancing control method in a sequential order according to further another exemplary embodiment of the present disclosure.

FIG. 10 is a flowchart illustrating a balancing control method in a sequential order according to further another exemplary embodiment of the present disclosure.

Referring to FIG. 10, it can be seen that S308 is added between S300 and S310 when the embodiment of FIG. 10 is compared to the embodiment of FIG. 3 described in the foregoing. Accordingly, the added step S308 is described below, and because the other steps are the same as described in the foregoing, an overlapping description is omitted herein.

In S308, the control unit 160 determines whether the control unit 160 has received a charge capacity balancing request signal outputted from the BMS 120 before the BMS 120 has switched to a sleep mode. The charge capacity balancing request signal refers to a signal outputted from the BMS 120 to the control unit 160 when the BMS 120 determines that a charge capacity balancing operation of the secondary battery cells 111 is necessary, as described in the foregoing. Accordingly, when the control unit 160 does not receive the charge capacity balancing request signal (NO in S308), the process ends since the charge capacity balancing operation is unnecessary. In contrast, when the control unit 160 receives the charge capacity balancing request signal (YES in S308), the control unit 160 passes the process to S310. The process subsequent to S310 is the same as the embodiment of FIG. 3.

According to the present disclosure, since the charge capacity balancing operation may start under the consideration of an environment condition suitable to perform the charge capacity balancing operation, sufficient time for the charge capacity balancing operation of the secondary battery cells may be ensured. Accordingly, this may reduce the possibility of the balancing operation being interrupted. Also, as sufficient time for the charge capacity balancing operation of the secondary battery cells is ensured, an efficient balancing operation may be achieved. Accordingly, a charge capacity difference between the secondary battery cells may be further reduced.

Meanwhile, in the description of the present disclosure, each component of the balancing control apparatus of the present disclosure shown in FIGS. 1 and 2 should be understood as a logic component rather than a physically distinguishable component.

That is, each component corresponds to a logic component for realizing the technical spirit of the present disclosure, and thus, it should be understood that though each component is integrated or separated, it falls within the scope of the present disclosure if a function performed by a logic component of the present disclosure can be implemented, and it falls within the scope of the present disclosure regardless of whether names are identical or not if it is a component performing an identical or similar function.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A balancing control apparatus that controls charge capacity balancing of at least two secondary battery cells included in a battery pack, the balancing control apparatus comprising:
    a global positioning system (GPS) module to output current geographical location data of the battery pack using a signal received from a GPS satellite;
    a real-time clock to store a present time; and
    a control unit, for when the current geographical location data of the battery pack received from the GPS module matches any one geographical location information among at least one preset geographical location information and a battery management system (BMS) managing and controlling the battery pack is in a sleep mode, a real-time clock is used to calculate a sleep mode duration of the BMS, and when the calculated duration is more than or equal to a preset reference period, outputs a control signal for a charge capacity balancing operation of the secondary battery cells included in the battery pack.

2. The balancing control apparatus according to claim 1, wherein the control signal outputted from the control unit is a signal for switching the BMS from a sleep mode to an awake mode.

3. The balancing control apparatus according to claim 1, wherein the control signal outputted from the control unit is a signal for controlling the apparatus for charge capacity balancing of the secondary battery cells.

4. The balancing control apparatus according to claim 1, wherein the control unit determines whether the geographical location data matches the geographical location information, by determining whether the geographical location data is included in a preset radius from the geographical location information.

5. The balancing control apparatus according to claim 1, wherein the preset geographical location information is information inputted by a user of the battery pack through a user interface.

6. The balancing control apparatus according to claim 1, wherein the preset geographical location information is location information associated with a place where the battery pack is charged.

7. The balancing control apparatus according to claim 6, wherein the control unit stores, as charging location data, the geographical location data received from the GPS module when the battery pack is charged, calculates a number of charge cycles for a same region in the stored charging location data, and sets, as the geographical location information, charging location data exceeding a preset number of charge cycles among the calculated number of charge cycles.

8. The balancing control apparatus according to claim 6, wherein the control unit stores, as charging location data, the geographical location data received from the GPS module when the battery pack is charged, calculates a charging ratio for a same region in the stored charging location data, and sets, as the geographical location information, charging location data exceeding a preset charging ratio among the calculated charging ratio.

9. The balancing control apparatus according to claim 6, wherein the control unit stores, as charging location data, the geographical location data received from the GPS module when the battery pack is charged, calculates a charging ratio for a same region in the stored charging location data, and sets, as the geographical location information, charging location data corresponding to a preset number of highest ratios among the calculated charging ratio.

10. The balancing control apparatus according to claim 1, wherein the control unit determines whether the current geographical location data of the battery pack received from the GPS module matches the at least one preset geographical location information or calculates the sleep mode duration of the BMS, when the control unit receives a charge capacity balancing request signal outputted from the BMS before the BMS has switched to the sleep mode.

11. The balancing control apparatus according to claim 1, further comprising:
    a memory unit to store the geographical location data, the preset geographical location information, and the preset reference period.

12. A battery management system comprising a balancing control apparatus according to claim 1.

13. A battery pack comprising:
    a battery management system according to claim 12; and
    at least two secondary battery cells.

14. A balancing control method that controls charge capacity balancing of at least two secondary battery cells included in a battery pack, the balancing control method comprising:
    (a) determining whether current geographical location data of the battery pack received from a global positioning system (GPS) module matches any one geographical location information among at least one preset geographical location information;
    (b) determining whether a battery management system (BMS) managing and controlling the battery pack is in a sleep mode when the geographical location data matches the geographical location information;
    (c) calculating a sleep mode duration of the BMS when the BMS is in the sleep mode, and determining whether the calculated sleep mode duration of the BMS is more than or equal to a preset reference period; and
    (d) outputting a control signal for a charge capacity balancing operation of the secondary battery cells when the sleep mode duration of the BMS is more than or equal to the preset reference period.

15. The balancing control method according to claim 14, wherein the control signal for the charge capacity balancing operation of the secondary battery cells is a signal for switching the BMS from a sleep mode to an awake mode.

16. The balancing control method according to claim 14, wherein the control signal for the charge capacity balancing operation of the secondary battery cells is a signal for controlling an apparatus for charge capacity balancing of the secondary battery cells.

17. The balancing control method according to claim 14, wherein the step (a) comprises determining whether the geographical location data is included in a preset radius from the geographical location information.

18. The balancing control method according to claim 14, wherein the preset geographical location information is information inputted by a user of the battery pack through a user interface.

19. The balancing control method according to claim 14, wherein the preset geographical location information is location information associated with a place where the battery pack is charged.

20. The balancing control method according to claim 14, further comprising:
   storing, as charging location data, the geographical location data received from the GPS module when the battery pack is charged, calculating a number of charge cycles for a same region in the stored charging location data, and setting, as the geographical location information, charging location data exceeding a preset number of charge cycles among the calculated number of charge cycles.

21. The balancing control method according to claim 14, further comprising:
   storing, as charging location data, the geographical location data received from the GPS module when the battery pack is charged, calculating a charging ratio for a same region in the stored charging location data, and setting, as the geographical location information, charging location data exceeding a preset charging ratio among the calculated charging ratio.

22. The balancing control method according to claim 14, further comprising:
   storing, as charging location data, the geographical location data received from the GPS module when the battery pack is charged, calculating a charging ratio for a same region in the stored charging location data, and setting, as the geographical location information, charging location data corresponding to a preset number of highest ratios among the calculated charging ratio.

23. The balancing control method according to claim 14, further comprising:
   determining whether a charge capacity balancing request signal outputted from the BMS is received before the BMS has switched to the sleep mode,
   wherein the step (a) or (b) is performed when the charge capacity balancing request signal is received.

24. The balancing control method according to claim 14, further comprising:
   storing the geographical location data, the preset geographical location information, and the preset reference period.

* * * * *